Aug. 27, 1935.　　　C. G. STRANDLUND　　　2,012,458
PLOW
Original Filed July 3, 1933　　6 Sheets-Sheet 2

WITNESS.
Edward Melin.

INVENTOR
Carl G. Strandlund
BY
Brown, Jackson, Boettcher & Dienner
ATTORNEYS.

Aug. 27, 1935.　　　C. G. STRANDLUND　　　2,012,458
PLOW
Original Filed July 3, 1933　　6 Sheets-Sheet 3

Aug. 27, 1935. C. G. STRANDLUND 2,012,458
PLOW
Original Filed July 3, 1933 6 Sheets-Sheet 5

WITNESS.
Edward Melin.

INVENTOR
Carl G. Strandlund
BY Brown, Jackson
Boettcher & Dienner
ATTORNEYS.

Patented Aug. 27, 1935

2,012,458

UNITED STATES PATENT OFFICE 2,012,458

PLOW

Carl G. Strandlund, Moline, Ill., assignor to Deere & Company, Moline, Ill., a corporation of Illinois Application July 3, 1933, Serial No. 678,754
Renewed May 16, 1935

21 Claims. (Cl. 97—47)

The present invention relates generally to agricultural implements and is particularly concerned with the provision of an improved two-way tractor plow having novel lifting connections by which either plow unit may be lowered independently of the other and novel means for locking the plow in raised position so that it is maintained out of the way of the plow in lowered position. In its more generic aspects, the present invention contemplates improved connections adapted for any implement embodying a tool unit or units which are shiftable from operative to inoperative position with means for locking or holding the unit in its inoperative position.

Another object of the present invention is the provision of improved means connecting the tool units to their supporting frame in such a manner that the transmission of draft to the tool in its operative or working position is not interfered with but the connecting means is so constructed and arranged that when the tool unit is shifted to its inoperative position, the tool unit is at the same time moved to a given or predetermined position.

More specifically, it is the purpose of the present invention to provide a two-way plow having spring means for transmitting the draft from the tractor or other wheeled frame supporting the plow units to said units, which spring means is given a definite bias which is effective to shift the plow in raised position to one side of the tractor out of the way of the plow in working position. The bias of such spring means is such that the lateral deviations of the unit in operating position is not materially restrained. These connections preferably include a pair of laterally spaced compression springs or the equivalent for each of the plow units, one of the spring means being made relatively strong and positioned adjacent the center of the tractor or wheeled supporting frame to transmit the pulling load while the other spring means is made relatively weak to permit a certain amount of lateral swinging movement of the plow with respect to its supporting frame but which is sufficiently strong to prevent lateral swinging of the plow when in raised position.

Another object of the present invention is the provision of improved lifting and adjusting mechanism for implement units and the like, such as those carried by a tractor and connected with the draw bar thereof. According to the principles of the present invention, the novel connections include a rock shaft or the equivalent carried by the tractor and operatively connected to rock the tractor draw bar to adjust the height of hitch for the tools, such rock shaft also supporting at least a portion of the connections which are operative to raise and lower the tools.

These and other objects and advantages of the present invention will be apparent to those skilled in the art after a consideration of the following detailed description of the preferred construction, taken in conjunction with the accompanying drawings forming a part of the specification.

Referring now to the drawings, the preferred form of the invention is illustrated in Figures 1 to 5, inclusive, from which it will be observed that the machine chosen to illustrate the principles of the present invention is a two-way plow. Two-way plows are especially adapted to plow hilly fields, irregular fields and irrigated fields that must be kept level for proper regulation of water flow in the ditches. In using two-way plows, the operator starts on one side of the field and plows back and forth until the field is finished, first using one of the plow units and then the other, thus eliminating dead furrows and back ridges. The two-way plows include two complete plow bottoms or units, one left hand and one right hand, as is well understood in the art. Two-way plows are well known in the art and it is to be further understood that the principles of the present invention are equally applicable to other forms of agricultural implements including movably mounted soil engaging or operating units, shiftable into and out of operative position. It will therefore be understood that the present invention and the teachings thereof may be utilized in implements other than plows or the like.

Figure 1:
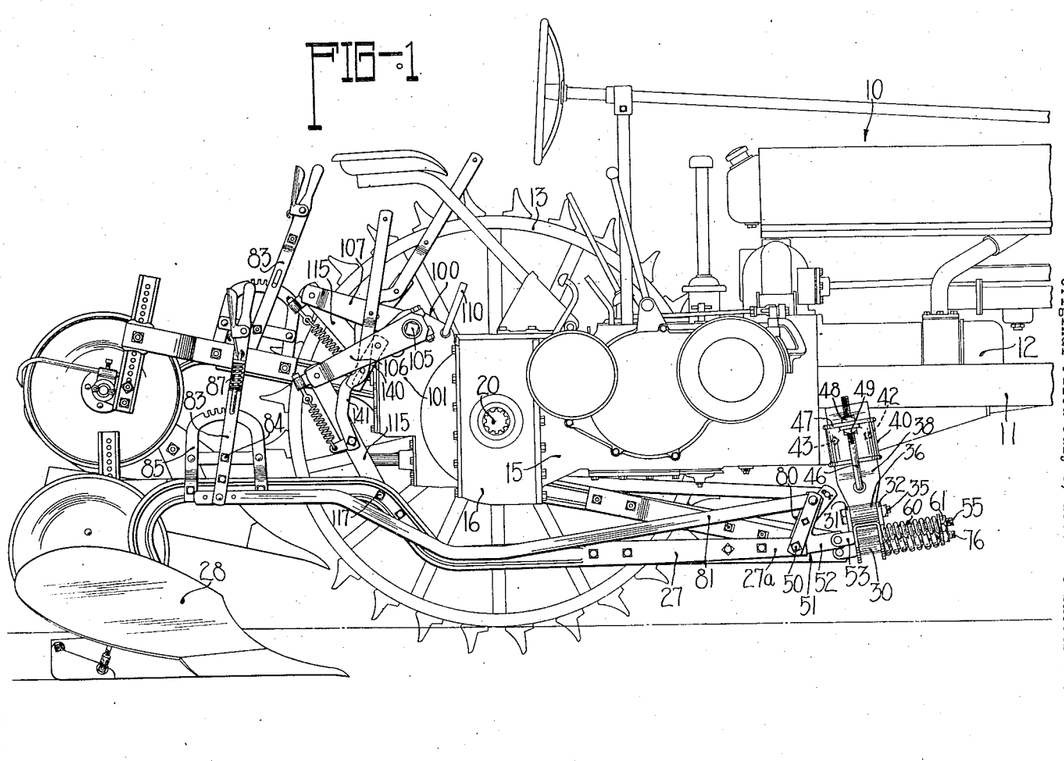
Figure 1 is a fragmentary side elevation with certain parts removed and showing the application of the present invention to a tractor propelled two-way plow, one of the plow units being in elevated position while the other plow unit is in working or ground engaging position.

The two-way plow illustrated in the drawings is of the type adapted to be attached to and carried by a wheeled supporting frame in the form of a tractor of more or less conventional construction, the plow being in the nature of an attachment adapted to be secured to and removed from the tractor. In Figure 1, the tractor is indicated by the reference numeral 10 and consists of means 11 serving as a frame for supporting a tractor motor 12 and having front wheels (not shown) and rear traction wheels 13. The tractor also includes a transmission casing 15 including the usual gear connections and differential mechanism between the motor 12 and the rear drive wheels 13. The housing 15 is provided with a rear section 16 from which right and left hand axle housings 17 and 18 extend and in which the driving axles 20 and 21 are journaled. The drive wheels 13 are adjustably mounted on the axles 20 and 21 and are so arranged that their tread spacing may be varied according to conditions.

Figure 2:
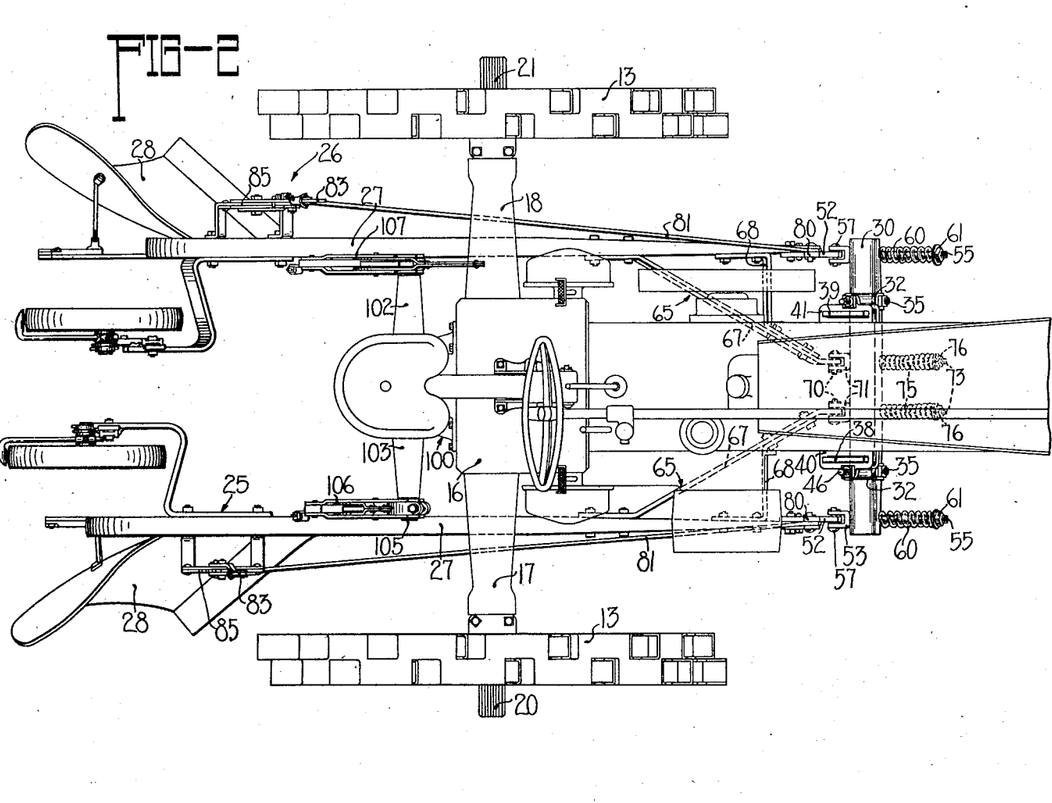
Figure 2 is a top plan view of the machine illustrated in Figure 1.

The two-way plow units adapted to be attached to the tractor 10 are indicated in Figure 2 by the reference numerals 25 and 26 and are similar in all respects except that the plow bottoms of the two units are shaped to throw furrows in opposite directions. Each unit comprises a plow beam 27 shaped as best shown in Figure 1 and carrying a plow bottom or furrow opener 28 at its rear end.

Approximately mid-way of the front and rear ends of the tractor frame 11 is a transversely disposed draft bar 30 to which the forward ends of the tool beams 27 are connected as will be described later. The draft bar or beam 30 is preferably of channel section having substantially vertical flanges to which attaching plates 31 and 32 are secured at opposite ends thereof, as by welding or the like. The upper ends of these plates 31 and 32 are apertured to receive attaching bolts 35 which are disposed in the lower looped sections 36 of a pair of plates or bars 38 and 39 adjustably fixed in vertically positioned slots or openings in a pair of brackets 40 and 41 which are bolted to opposite sides of the tractor by means of bolts 42 and 43. The means for adjustably fixing the plates 38 and 39 in the brackets 40 and 41 consist of a bolt 46 or the equivalent which is anchored at its lower end to the associated plate and which extends upwardly through a perforation in a lug 47 extending outwardly and laterally from the associated bracket. Nuts 48 and 49 threaded onto the bolt 46 and disposed on opposite sides of the lug 47 serve to retain these parts in vertical adjustment. It will be understood, of course, that any other means for rigidly and adjustably connecting the draft bar or draft beam 30 to the tractor may be utilized if desired.

The forward ends of the tool beams 27 are operatively connected with the transversely disposed draft bar 30 by connections providing for vertical and horizontal movement of the tool beams with respect to the wheeled supporting frame, namely, the tractor 10, which connections are so constructed and arranged to prevent lateral swinging of the operating unit which has been raised to inoperative position. Such connections will now be described. The forward end portion 27a of each of the tool beams 27 carries a pivot bolt 50 to which is secured a bell crank 51 having a horizontally disposed and forwardly extending arm 52 pivotally connected to the bifurcated end 53 of a draft rod or plunger 55 slidingly disposed in perforations in the depending flanges of the draft bar or draft beam 30. Preferably, the connection between the forward end of the bell crank arm 52 and the rear end of the plunger 55 consists of a pivot bolt or pivot pin 57. A compression spring 60 is disposed on the plunger 55 forwardly of the draft beam 30 and is confined between the forward flange of the latter and an adjusting nut 61 threaded on the front end of the plunger 55.

A laterally extending framework 65 is rigidly connected with the forward end portion 27a of each of the tool beams 27, and this inwardly extending framework 65 consists of members 67 and 68 suitably bolted or riveted together and to the tool beam 27 in any desired manner. The forwardmost end of the member 67 extends to a point in lateral alignment with the forward end of the bell crank arm 52 and is bent, as best shown in Figure 2, so as to extend in parallelism therewith. This end of the member 67 is apertured to receive a pivot pin or bolt 70 which is carried by the rear bifurcated end 71 of an inner draft rod or plunger 73. Like the draft rod or plunger 55, the plungers 73 extend through perforations in the central portion of the draft bar 30, and spring means 75 embraces the forward ends of the plungers 73 and are confined between the forward flange of the draft bar 30 and adjusting nuts 76 threaded onto the plungers 73.

Since the right and left hand plow or implement units are substantially identical, the same or similar parts have been indicated by identical reference numerals.

The above described hitch connections are preferably such that the spring means 75 is made sufficiently strong and heavy so as to transmit practically all of the pulling load of the tractor to the plow body or furrow opener 28, the pivot connections 70 being made loose enough to permit some lateral swinging of the tool beam 27 when in operative position. The companion spring means 60 is considerably weaker than the spring means 75 so that lateral swinging of the tool beam 27 in operative position, responsive to changes in the direction of the line of draft caused by steering the tractor or when the center of load on the plow unit shifts, as when striking a rock on one side, is permitted, but the spring means 60 is made sufficiently strong to prevent the lateral swinging of the plow when in raised position or when the plow unit has been lifted enough to bring the plow body out of engagement with the ground. In other words, under the influence of changes in the line of draft, the tool beam 27 in operative or working position swings about the pivot point 70, the corresponding movement of the end of the bell crank arm 52 being accommodated by the yielding of the relatively weak spring means 60 while the spring means 75 is effective to transmit practically all of the draft forces to the tool beam 27 through the frame member 67. However, when the implement tool beam has been raised, the spring means 60 becomes immediately effective to swing the tool beam laterally outwardly of its supporting frame, namely, the tractor, to a position out of the way of the opposite tool beam so as to permit the latter to have relatively unrestricted lateral movement about its hitch point 70.

It is to be noted that each of the plow units is connected with the transversely disposed draft bar or draft beam 30 at two laterally spaced points, at one of which the draft transmitting means is disposed while at the other point the biased means is disposed for swinging the tool beam to a given lateral position when it has been raised out of ground engaging position. It will also be noted that only the laterally outer points, namely, 57, are provided with the bell cranks 51. The function of the bell cranks 51 is to level the plow unit. The connections by which this is accomplished will now be described.

Each of the bell cranks 51 includes an upwardly disposed arm 80 to which a generally longitudinally extending link 81 is connected, the rear end of the link 81 being connected to an adjusting lever 83 pivotally supported, as at 84', on a sector 85 rigidly supported from the associated plow beam 27. Suitable latch mechanism 87 is provided and cooperates with a toothed portion of the sector 85 to retain the adjusting lever 83 in any given position. By releasing the latch mechanism 87 and swinging the lever 83, the bell crank 51 may be adjusted to raise or lower the hitch point 50 at which the forward end 27a of the associated tool beam 27 is connected. Since the laterally inner portion of the framework 65 secured to the tool beam 27 is connected directly to the inner draft plunger 73, the vertical adjustment of the point 50 serves to level the unit. Each of the units 25 and 26 is provided with such an adjusting mechanism, and hence a description of one will suffice.

The tractor 10 is provided with power lift mechanism 100 embodying a housing 101 (see Figure 1) from which extend two laterally directed tubular members 102 and 103 that support and enclose an actuating rock shaft means 105 having at its outer ends arms 106 and 107, respectively. Suitable one-cycle or half revolution clutch mechanism is disposed within the housing 101 and operatively connected to the gearing contained in the transmission housing 15. Such clutch mechanism is controlled by means of a trip lever 110. Actuation of the lever 110 serves to rock the shaft or shafts 105 to raise and lower the implement plow units. The present invention is not concerned with the particular details of the power lift clutch and hence the same has not been completely illustrated in the drawings. It is to be understood, therefore, that the present invention contemplates any form of power lift clutch for rocking the rock shaft 105. Preferably, however, the power lift mechanism 101 is of such construction that the rock shaft 105 is rocked first in one direction thru an angle of about 45° and then back again to its original position.

The lifting connections between the rock shaft arms 106 and 107 and the plow units include links 115 pivotally connected to the outer ends of the arms 106 and 107 and to the tool beams 27, as at 117. Preferably, each of the lifting arms 106 and 107 comprises a pair of plates 120 and 121 riveted or otherwise secured together at their outer ends, as by a spacer 122, and journaled at their inner ends on cylindrical portions of a casting 123 bolted, as at 125, over the squared end of the rock shaft 105. The two plates 120 and 121 are fastened together intermediate their ends by a spacer member 127. The casting 123 includes a lug portion 130 which is disposed underneath the two arm sections 120 and 121 so that whenever the rock shaft 105 is rocked in a clockwise direction as viewed in Figures 1, 3 and 4, the lifting arm will be rocked therewith, the lug portion 130 abutting against the lower edges of the plates or arm sections 120 and 121. By virtue of this construction, however, the rock shaft 105 may be rocked in a counterclockwise direction without causing the lifting arm 106 to move therewith, the lug portion 130 merely moving away from the lower edge of the plates 120 and 121, as will be referred to later.

Figures 3, 4, 5:
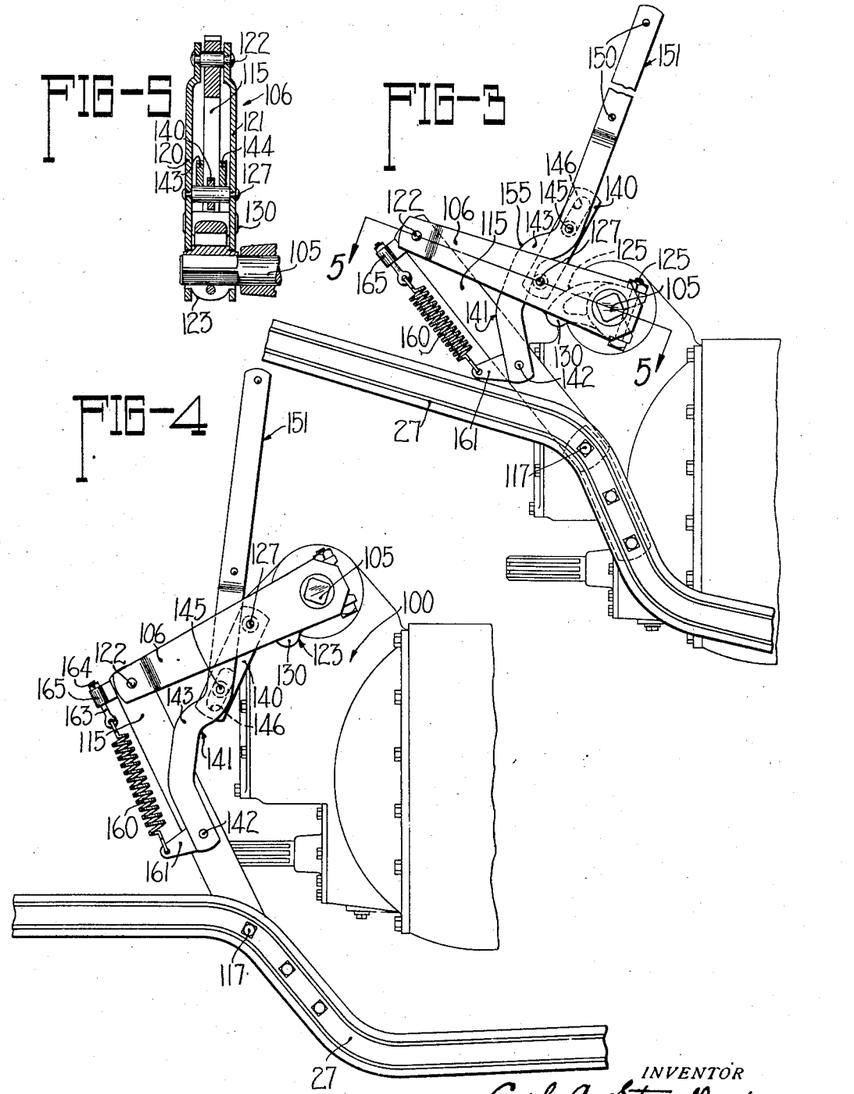
Figure 3 is an enlarged side elevation showing the lifting connections as they appear when the plow unit associated therewith is in its raised or inoperative position.
Figure 4 is a view similar to Figure 3 but illustrating the position of the parts when the plow unit is in working position.
Figure 5 is a section taken along the line 5—5 of Figure 3.
Figure 6:
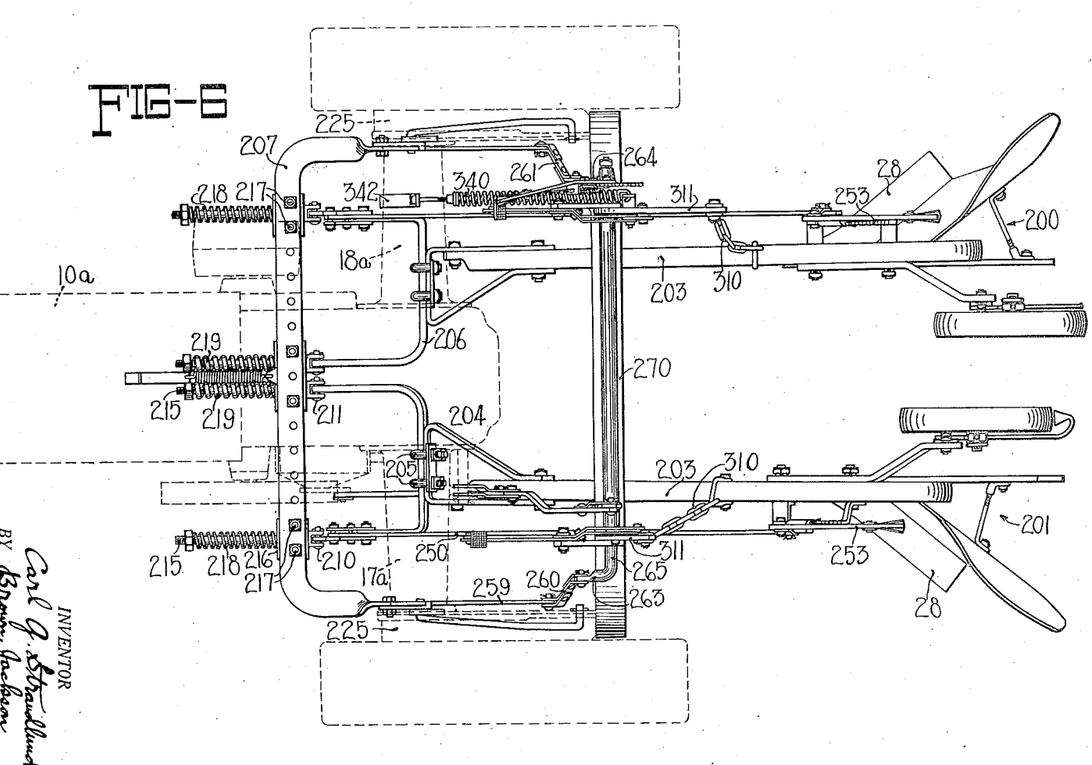
Figure 6 is a top plan view of a modified form of the present invention, illustrating the principles of the present invention as embodied in slightly different draft and lifting connections.

The spacing member 127 is utilized for pivotally connecting a link 140 to the two plates 120 and 121 of the lifting arm 106, and in a similar manner, the member 122, which is also a spacer, serves to pivotally connect the upper end of the link 115 with the outer end of the arm 106. A second link member 141 is pivotally connected, as at 142, with the link 115 at a point intermediate the ends thereof. The link member 141 comprises two links or straps 143 and 144, as best shown in Figure 5, these links being disposed on opposite sides of the link member 115 and likewise on opposite sides of the link 140. The links 143 and 144 are fastened together intermediate their ends by a pin or rivet 145 disposed within a slot 146 formed in the outer end of the link 140, and the outermost portions of the links 143 and 144 are riveted together, as at 150, to provide a convenient actuating handle 151.

The link members 140 and 141 constitute, in effect, toggle links and are operative when locked to fix the arm 106 and link 115 in position to hold the tool beam 27 associated therewith in elevated relation. The links 140 and 141 are shown in their over-center or locked relation in Figure 3 from which it will be observed that the pivot connection 145 is disposed to the right of the line joining the pivots 142 and 127. By virtue of this relation the weight of the implement 27 being transmitted through the links 115 and 141 to the link 140 establishes a couple acting to rotate the toggle link 140 in a clockwise direction as viewed in Figure 3. This rotation is prevented, however, by virtue of the contact between the curved section 155 of the link member 141 and the rivet 127, as best shown in Figures 3 and 5. It will thus be apparent that by rigidly connecting the pivot points 127 and 142, the link 115 and the arm 106 are fixed in a given angular position so that the weight of the raised tool beam is transmitted thereby to the cylindrical portion of the casting 123 mounted on the rock shaft 105.

The toggle lock 140—141 just described may be broken by rocking the handle 151 rearwardly, or in a counterclockwise direction as viewed in Figure 3. Moving the handle 151 in this manner will shift the pivot 145 to the left of the line joining the pivots 142 and 127, the weight of the tool beam 27 then becoming effective to extend the toggle links 140 and 141 and to swing the arm 106 and associated parts to the position shown in Figure 4, which is the working position for the plow bodies or other tools carried by the beam 27.

In order to raise the tool beam to the position shown in Figure 3, the trip lever 110 is actuated and the associated clutch mechanism causes the partial rotation of the power lift shaft 105 in a clockwise direction as viewed in Figure 4. By virtue of this movement, the lug 130 abuts the lower edges of the plates 120 and 121 making up the lifting arm 106, thus swinging the arm 106 upwardly as the rock shaft 105 is rocked in a clockwise direction. This upward movement of the arm 106 acts through the link 115 to raise the beam 127. During this movement, the upward movement of the link 115 raises the toggle link 141 and swings the toggle link 140 upwardly to substantially the position shown in Figure 3. In order to insure that the toggle links 140 and 141 will become locked, a spring 160 is anchored to a bracket 161 carried at the lower end of the link 141. The spring 160 is also anchored to an eye bolt 163 adjustably fixed, as at 164, in a bracket 165 fixed to the upper end of the link 115. Thus, as the toggle link 140 is swung upwardly approaching the position shown in Figure 3, the tension of the spring 160 is sufficient to swing the link 141 in a clockwise direction as viewed in Figure 3 so as to dispose the pivot 145 to the right of the line joining the pivots 142 and 127. The slot 146 in the link 140 permits this additional movement and, in addition, permits a limited amount of vertical movement of the tool beam 27 and the links 115 and 141 without unduly swinging the handle 151.

Whenever the rock shaft 105 is rotated to the position shown in Figure 3, both of the plow units will be lifted to a raised position and will be automatically locked in their raised position by the toggle mechanism just described. Preparatory to dropping either of the plow units, the power lift is operated again to cause the rock shaft 105 to rotate back to the position shown in Figure 4, thus rotating the lug 130 on each of the castings 123 away from the lifting arms 106 and 107. Then, to drop either of the plows, the lever 151 for that plow is pulled rearwardly thus unlocking the over-center or toggle lock and permitting the associated lifting arm to rotate back to the position shown in Figure 4.

The connection of the links 115 and of the links 140 with the lifting arms 106 and 107 are made loose so as not to interfere with the lateral swinging of the plow units. The provision of the slots 146 also provides for any manufacturing inaccuracies in the links and associated parts.

Figures 6 to 12, inclusive, illustrate another form of construction embodying certain of the principles of the present invention referred to above and of the features many of which may, if desired, be applied to the construction shown in Figures 1 to 5, inclusive. Primarily, however, the construction shown in Figures 1 to 5 is particularly adapted to be associated with tractors or the like having a live axle construction while the form of machine shown in Figures 6 to 12 is particularly adapted to be associated with a wide tread tractor or the like having an arched axle. Referring now to the latter figures, two substantially identical plow units 200 and 201 are provided, each of the units including a tool beam 203 which has a bracket 204 fixed to its forward end and connected, as by U-bolts 205, to a U-shaped bracket 206. Each of the brackets 206 is connected to the draw bar 207 of the tractor 10a at two laterally spaced points 210 and 211, these points being established by means of pivot pins or studs carried by the bifurcated rear ends of draft bolts or plungers 215 slidingly supported in U-shaped brackets 216 bolted or otherwise secured, as at 217, to the tractor draw bar 207. The draft bolts or plungers 215 have springs 218 and 219 associated therewith and so constructed and arranged as to function in the same manner as the spring means 60 and 75 described above.

Figures 8, 9, 10, 11, 12:
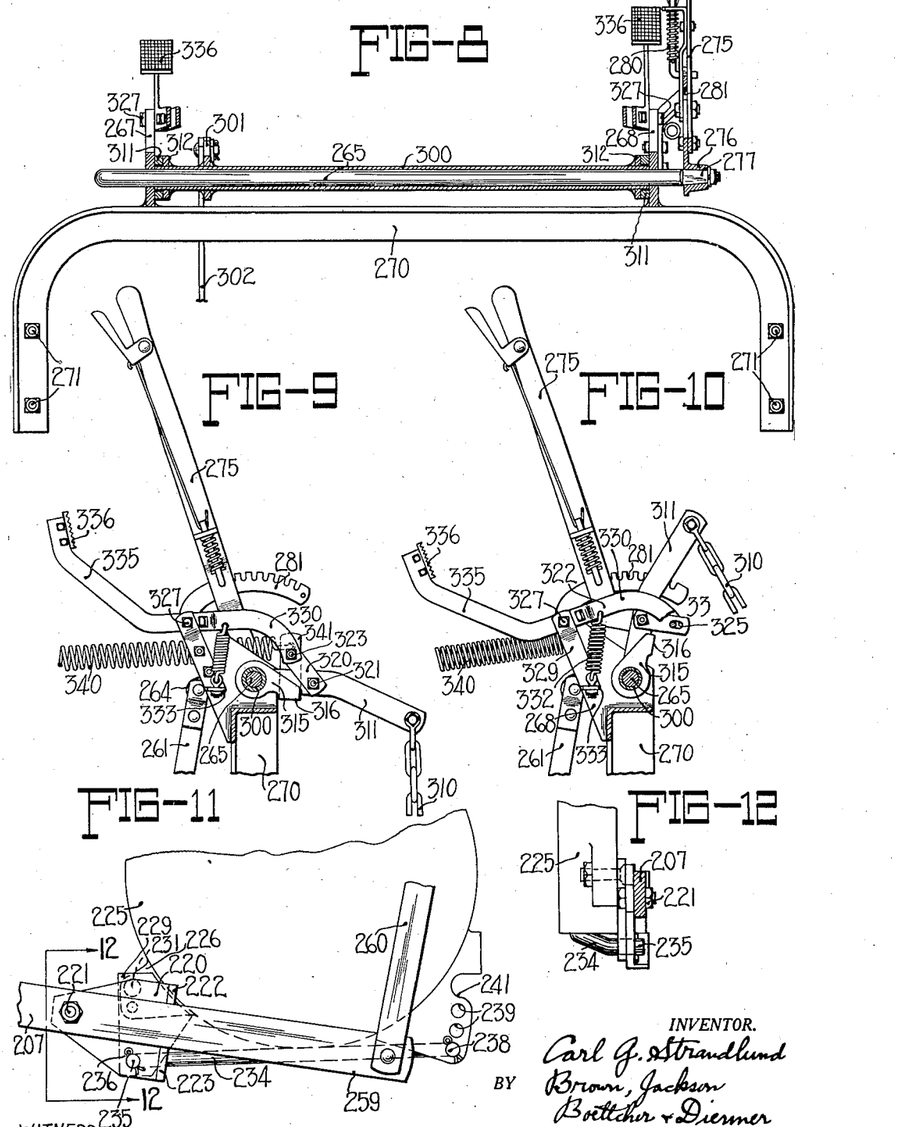
Figure 8 is a vertical view, partly in section and partly in elevation, illustrating the manner in which a portion of the height adjusting connections are utilized as a bearing for the connections utilized in raising the plow units to inoperative position.
Figures 9 and 10 illustrate two positions of the lifting connections and the associated toggle lock mechanism.
Figure 11 is a fragmentary elevation, illustrating the pivotal supporting means for the draw bar to which the tool beams and plow units are connected, the height of hitch for the tool beams being adjusted by rocking the draw bar.
Figure 12 is a section taken along the line 12—12 of Figure 11.

In order to effect the hitch connection just described, the draw bar 207 is preferably disposed in a reverse position, being connected with the drive housings of the tractor 10a as will now be described. The draw bar 207 of the tractor is rockably supported thereon for vertical movement about a transverse axis to provide for raising and lowering the hitch point of the tool beams 203, the latter being provided with plow bodies 28 as in the previously described modification. In order to have the axis about which the draw bar 207 rocks intersect the line of draft to each plow, the draw bar 207 is provided with a bracket 220 fixedly connected thereto or carried thereby by means of a bolt 221 passing through the forward portion of the bracket 220 and the corresponding section of the draw bar 207 and by lugs 222 and 223 formed integral with the bracket 220 and bearing on the opposite edges of the draw bar 207, as best shown in Figure 11.

The tractor 10a includes generally downwardly extending drive housings 225 provided with attaching lugs 226 formed thereon or carried thereby. To each lug a depending bracket 229 is pivoted, as by means of a bolt 231, but the depending bracket 229 is held rigid with respect to the tractor by means of a tie link 234 having a forward inturned end 235 extending through an opening in the lower portion of the bracket 229 and also through an opening in the lower portion of the draw bar bracket 220 and secured in position by means of a cotter key 236 or the equivalent. The rear end 238 of the tie link 234 is disposed in one of the openings 239 in a lug 241 formed on the drive housing 224. If desired, the forward lug 226 on the drive housing may also be provided with a plurality of two or more openings to receive the bolt 231 in various positions. The forward inturned end 235 of the tie link 234, in connection with the companion tie link on the other side of the machine, defines the pivot axis about which the tractor draw bar 207 swings in effecting adjustment as to the height of hitch for the tool beams 203. By virtue of the depending plate or bracket 229 and the bracket 220 on the draw bar, this axis can be disposed substantially in the line of draft from the tractor to the plow body in working position.

The plow units 203 are leveled by an arrangement which is similar in many respects to the means for the same purpose described above. The outermost portion of the U-shaped bracket 206 is provided with a bell crank 245 having an arm portion 246 connected with the pivot 210 and a second arm portion 247 connected with a longitudinally extending link 250. The rear portion of the tool beam 203 carries a sector 251 to which is pivoted an adjusting lever 253, as at 254, the lower end of the lever 253 being connected, as at 256, with the rear end of the link 250. Swinging the adjusting lever 253 will rock the bell crank 245, causing the latter to fulcrum about the pivot 210 to raise and lower the forward and outer portion of the tool beam 203, thereby leveling the plow body 28 carried thereby. Each of the plow units is provided with this form of leveling means.

The rear end portions 259 of the draw bar 207 are connected by means of links 260 and 261 with forwardly extending arms 263 and 264 secured to or carried by a transversely disposed rock shaft 265 supported for rocking movement in a pair of laterally spaced brackets 267 and 268. These brackets are fixed, as by welding or the like, to a U-shaped angle iron support 270 disposed in a vertical position and secured, as by bolts 271, to the chain housings or drive housings 225 of the tractor.

The rock shaft 265 is rocked by means of an adjusting lever 275 fixed adjacent one end of the rock shaft, as by being bolted or otherwise secured to a casting 276 mounted on a squared end 277 of the rock shaft. The adjusting lever 277 includes the usual detent mechanism 280 cooperating with a sector 281 fixed to the bracket 268, as best shown in Figure 8. By rocking the lever 275, the draw bar 207 may be rocked about its pivots 235 to raise or lower the hitch points 210 and 211 for the tool beams 203.

Figure 7:
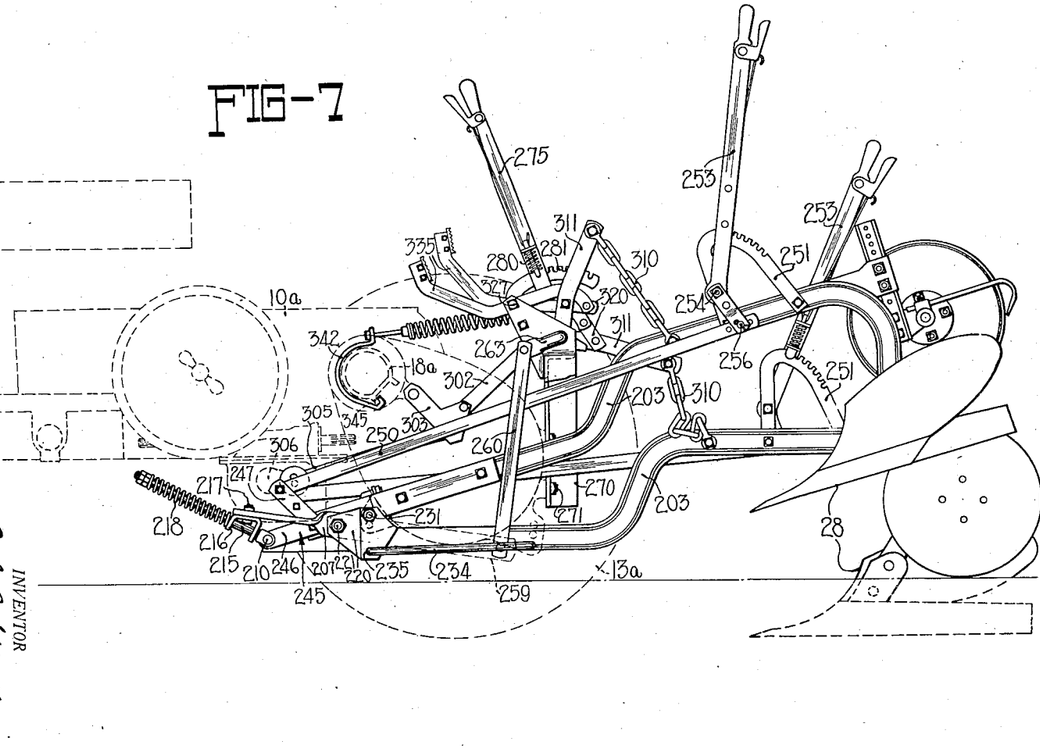
Figure 7 is a side elevation of the machine illustrated in Figure 6.

The plow units 200 and 201 are raised to inoperative position through lifting connections which include parts mounted on the rock shaft 265. Such connections include a pipe or tubular member 300 journaled over the rock shaft 265, as best shown in Figure 8, and are provided with an arm 301 fixed thereto, as by welding or the like, and link connected, as by a link member 302, to a pendulum link 303 mounted on the tractor, as best shown in Figure 7, and rocked by means of a connection 305 with the power lift 306 of the tractor. Each of the tool beams 203 is connected by a chain 310 with an arm 311 journaled on one end of the tubular pipe member 300. Each of the arms 311 is confined between the associated brackets 267 or 268, and a collar 312 fixed to the pipe member 300, as by welding or the like. Each of the collars 312 has an arm portion 315 formed integral therewith or carried thereby and having a laterally extending lug 316 adapted to engage the underside of the associated lifting arm 311.

By virtue of this construction, as best illustrated in Figures 9 and 10, whenever the tubular pipe member 300 is rocked, as by actuation of the power lift 306 of the tractor, in a counter-clockwise direction from the position shown in Figure 9 to the position shown in Figure 10, the lifting arms 311 are elevated, thereby lifting either or both of the plows 203.

Locking mechanism is provided for holding either or both of the lifting arms 311 in elevated position independently of the subsequent rocking of the lugs 316 back to their position shown in Figure 9. Such rocking mechanism includes toggle links similar in many respects to the toggle lock means described above. One of the toggle links is indicated in Figures 9 and 10 by the reference numeral 320 and is pivotally connected, as at 321, with the associated lifting arm 311. The other link 322 is provided with a pivot bolt 323 received within a slot 325 formed in the outer end of the toggle link 320. The other toggle link 322 is pivotally supported at 327 on a stationary bracket 329, which may be a portion of one of the brackets 267 and 268. The toggle link 322 is offset, as at 330, to permit the pivot 323 to rotate below the line connecting the pivots 321 and 327, as best shown in Figure 10, whereby the associated lifting arm 311 is locked in raised position. The slotted construction 325 provides for the movement of the toggle links to their over-center relation and also accommodates manufacturing inaccuracies of these links. Each of the links 322 is biased for movement toward its locked position by means of a spring 332 connected with the arm at one end and anchored at its other end to a lug 333.

Each of the toggle links 332 has a forward section 335 which terminates in a pedal 336. By stepping on the pedal 336, the associated link 322 will be rocked upwardly about its pivot 327 to release the toggle lock and permit the associated tool beam 203 to drop.

To aid the power lift in raising the plow units 203, a lifting spring 340 has been provided and is secured at its rear end to an extension 341 formed on one of the arms 315. The forward end of the lifting spring 340 is anchored to a bracket 342 which embraces the right hand tubular axle housing or quill 18a of the tractor 10a and is formed to hook in back of a flange 345 thereon, as best shown in Figure 7.

While I have shown and described above the preferred constructions in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. An agricultural implement comprising a supporting frame, a tool beam movably connected in draft receiving relation therewith and shiftable to different positions with respect thereto under the influence of the application of draft thereto, and biased means providing for substantially unrestrained movement of said beam under the draft forces applied thereto but having sufficient bias after said draft forces are removed to automatically shift said tool beam back to one of its positions and hold the beam in that position.

2. An agricultural implement comprising a supporting frame, a tool beam movably connected therewith for vertical and horizontal movement and provided with ground engaging tool means, and biased means operatively connected with the tool beam and providing for lateral movement thereof under the influence of normal draft forces applied to said tool means when in ground engaging position but having sufficient strength to automatically shift said tool beam laterally of the frame when said tool means is raised out of ground engaging position.

3. An agricultural implement comprising a supporting frame, a tool beam movably connected with the frame and including a ground engaging tool shiftable into and out of ground engaging position, means connecting the tool beam with said frame and serving to establish an effective hitch point near the center of the frame, and biased means adapted to yield under the application of normal draft forces applied to said ground engaging tool when the latter is in its ground engaging position and acting to swing said tool beam laterally outwardly of said frame only when the tool beam is shifted out of ground engaging position.

4. An agricultural implement comprising a supporting frame, a tool beam movably connected with the frame and including a ground engaging tool shiftable into and out of ground engaging position, means serving as a generally transversely extending draft bar on the frame, a pair of laterally spaced generally longitudinally extending draft members carried by the tool beam and adapted to be attached to said draft means at laterally spaced points thereon, and relatively light spring means connecting one of said draft members with said draft bar means and providing for lateral movement of said tool beam about the point of attachment with the other of said draft members under the influence of normal draft forces applied to said ground engaging tool, said relatively light spring means causing the tool beam to swing laterally when said tool is out of ground engaging position.

5. An agricultural implement comprising a supporting frame, a tool beam movably connected with the frame and including a ground engaging tool shiftable into and out of ground engaging position, means serving as a generally transversely extending draft bar on the frame, a pair of laterally spaced generally longitudinally extending draft members carried by the tool beam and adapted to be attached to said draft means at laterally spaced points thereon, spring means connecting said draft members with said draft bar means, and means for moving said tool beam out of ground engaging position, one of said spring means being arranged to transmit the major portion of the draft to the tool beam and the other of said spring means being arranged to shift the tool beam laterally only after it has been shifted out of ground engaging position.

6. In combination, a supporting frame, a soil engaging unit, and means connecting said unit with said frame comprising spring means of sufficient strength to transmit the draft force from said frame to said unit and a second relatively weak spring means spaced laterally from said first spring means and providing for the lateral swinging of the unit in response to lateral shifting of the line of draft, said second spring means being sufficiently strong to prevent lateral swinging of the unit when shifted into an inoperative position.

7. In combination, a wheel supported frame, a plow unit, means connecting said plow unit to said frame comprising a spring of sufficient strength to transmit the draft force from said frame to said plow unit and a second relatively weak spring spaced laterally from said first spring permitting said plow unit to swing laterally responsive to lateral shifting of the line of draft, said second spring being sufficiently strong to prevent lateral swinging of the plow unit when raised into an inoperative position, and means for raising the plow unit into an inoperative position.

8. The combination with a supporting frame and an implement unit movably connected with said frame for relative movement, of an arm rockably mounted on said frame, a link pivotally connected with said arm and with said unit, means for rocking said arm to shift said unit to one position, and means for releasably locking said link to said arm when said arm is rocked to shift the unit to said position to thereby prevent said arm from rocking and to hold the unit in said position.

9. The combination with a wheeled frame and a plow unit pivotally connected to said frame for vertical movement, of an arm rockably mounted on said frame, a link pivotally connected to said arm and to said plow unit, means for rocking said arm to raise said plow unit to an inoperative position, and means for releasably locking said link to said arm when said arm is rocked to raise the plow unit to prevent said arm from rocking back to its first position.

10. An agricultural implement comprising a supporting frame adapted to have a tool beam pivotally connected therewith for generally vertical movement, a rockably mounted member on the frame, a second member movably mounted with respect to the frame and adapted to be operatively connected with said tool beam to raise the same, a pair of toggle links pivotally connected together by lost motion means and at least one of said toggle links being connected to one of said members, said toggle links being operative when swung to an over-center position to hold said members against relative movement in at least one direction to retain said tool beam in a raised position, means connecting said one toggle link with said one member for relative pivotal movement, the other toggle link being adapted to engage said means to define said over-center position, and spring means cooperating with one of said toggle links and operative to move said toggle links into said position.

11. An agricultural implement comprising a supporting frame, a generally transversely disposed draft bar, a pair of laterally spaced brackets carried by said frame and including slotted portions, movably mounted plate members connected, respectively, with said slotted portions and secured to said draft bar, means adjustably securing said plates to said brackets to fix the position of said draft bar with respect to said frame, and an operating unit connected with said draft bar.

12. An agricultural implement comprising a supporting frame, a generally transversely disposed draft bar, a pair of laterally spaced brackets carried by said frame and including slotted portions, movably mounted plate members connected, respectively, with said slotted portions and secured to said draft bar, means adjustably securing said plates to said brackets to fix the position of said draft bar with respect to said frame, draft connections carried by said draft bar and including swingably mounted bell cranks, operating units connected with said bell cranks, and means connected with said bell cranks for adjusting the position of the forward ends of said operating units.

13. The combination with a tractor having a draft bar mounted for vertical movement with respect to the tractor and an implement connected to said draft bar for vertical movement, of a rock shaft, connections between said rock shaft and said draft bar whereby rocking of the rock shaft will move said draft bar vertically, a rocking member journaled upon said rock shaft, and means connecting said rocking member with said implement whereby rocking of said rocking member will raise said implement.

14. The combination with a tractor having drive housings with attaching lugs and a draw bar, an implement connected with said draw bar, a depending bracket pivotally connected with each of said lugs, rearwardly extending link means connected with the lower portion of said brackets and anchored to said drive housings for fixing the position of said brackets, a pair of brackets rigidly carried by said draw bar and pivotally mounted on the forward portion of said link means, and means connected with said draw bar for swinging the same vertically.

15. An agricultural implement comprising a supporting frame, a tool beam movably connected with the frame and including a ground engaging tool shiftable into and out of ground engaging position, means serving as a pair of laterally spaced draft members carried by the tool beam and adapted to be attached to said frame in draft transmitting relation, and relatively light spring means connecting one of said draft members with said frame and providing for lateral movement of said tool beam about the point of attachment with the other of said draft members under the influence of normal draft forces applied to said ground engaging tool, said relatively light spring means causing the tool beam to swing laterally when said tool is out of ground engaging position.

16. In combination, a supporting frame, a soil engaging unit, and means connecting said unit with said frame for lateral pivoting and comprising draft transmitting means for transmitting the draft force from said frame to said unit and a relatively weak spring means spaced laterally from said draft transmitting means and providing for the lateral swinging of the unit in response to lateral shifting of the line of draft, said spring means being sufficiently strong to prevent lateral swinging of the unit when shifted into an inoperative position.

17. The combination with a supporting frame and an implement unit movably connected with said frame for relative movement, of an arm rockably mounted on said frame, means connecting said arm with said unit, means for rocking said arm to shift said unit to one position, and means connected with said unit and said arm and operative, when said arm is rocked to shift the unit to said one position, for releasably locking the unit in said position.

18. The combination with a supporting frame and an implement unit movably connected with said frame for relative movement, of an arm rockably mounted on said frame, means connecting said arm with said unit, means for rocking said arm to shift said unit to one position, and means including toggle mechanism reacting against said unit and said supporting frame and moved into over-center relation when said arm is rocked to shift the unit to said position for releasably holding the unit in said position.

19. The combination with a supporting frame and an implement unit movably connected with said frame for relative movement, of an arm rockably mounted on said frame, means connecting said arm with said unit, means for rocking said arm to shift said unit to one position, means including toggle mechanism reacting against said unit and said supporting frame and moved into over-center relation when said arm is rocked to shift the unit to said position for releasably holding the unit in said position, and means tending to shift said toggle mechanism into its over-center position when said unit is in said one position.

20. The combination with a supporting frame and an implement unit movably connected with said frame for relative movement, of implement lifting mechanism carried by said frame, link means serving to connect said lifting mechanism with said implement unit, and means connected between said unit and said lifting mechanism independently of said link means for releasably locking said implement unit in raised position.

21. The combination with a supporting frame and an implement unit movably connected with said frame for relative movement, of implement lifting mechanism carried by said frame and including a pivotally mounted arm, link means serving to connect said arm with said implement unit, and means connected with said implement unit and arm independently of said link means for releasably locking said implement unit in raised position, one of the points of connection of said last named means being spaced from the associated point of connection of said link means.

CARL G. STRANDLUND.